US005189868A

United States Patent [19]

Hill

[11] Patent Number: 5,189,868

[45] Date of Patent: Mar. 2, 1993

[54] LEAF MULCHER

[76] Inventor: Jerry Hill, P.O. Box 1089, Nicoma Park, Okla. 73066

[21] Appl. No.: 856,310

[22] Filed: Mar. 23, 1992

[51] Int. Cl.[5] .................... A01D 34/70; B02C 13/08; B02C 13/28

[52] U.S. Cl. .................................. 56/13.3; 56/16.6; 241/56; 241/292.1

[58] Field of Search .................... 56/13.3, 13.4, 16.6, 56/320.2, DIG. 8; 241/56, 292.1

[56] References Cited

U.S. PATENT DOCUMENTS

| | | | |
|---|---|---|---|
| 3,134,212 | 5/1964 | Gary | 56/255 X |
| 3,588,179 | 6/1971 | Gifford | 56/13.3 X |
| 3,657,865 | 4/1972 | Ober | 56/13.3 |
| 3,884,020 | 5/1975 | Dahl et al. | 56/320.2 |
| 3,974,629 | 8/1976 | Russell | 56/13.7 |
| 4,189,904 | 2/1980 | Paker | 56/255 |
| 4,411,125 | 10/1983 | Strickland | 56/16.9 |
| 4,443,997 | 4/1984 | Namdari | 56/13.3 |
| 4,875,630 | 10/1989 | Carlson | 241/292.1 X |
| 4,890,446 | 1/1990 | Israel | 56/17.5 |
| 5,020,309 | 6/1991 | Hopkins | 241/292.1 X |

*Primary Examiner*—David J. Bagnell
*Attorney, Agent, or Firm*—Robert K. Rhea

[57] ABSTRACT

A leaf and vegetation shredder is formed by a power driven rotary blade cupped fan rotating in a fan housing connected in trailer fashion with a riding rotary lawn mower and operatively connected with the lawn mower vegetation discharge opening for increasing the air blast through the fan housing. Friction bars on the fan blades and an arc of the fan housing wall shred leaves and vegetation centrifugally forced therebetween.

2 Claims, 2 Drawing Sheets

LEAF MULCHER

BACKGROUND OF THE INVENTION

1. Field of the Invention

This invention relates to lawn care equipment and more particularly to a leaf mulcher connected with and receiving leaves picked up by the rotary lawn mower blade of a garden tractor.

Near the end of the growing season, deciduous trees shed their leaves which in addition to being unsightly when deposited on lawn grasses, tend to smother the vegetation. Many gardeners rake up such loose leaves and bag them in plastic receptacles for disposal.

It is well known that if such leaves are broken up or cut into sufficiently fine particles they will sift down between the blades of grass and not form a smothering or shading action thereon. Also, these fine leaf cuttings form an excellent mulch, preventing evaporation of water and adding humus to the soil when incorporated therein.

It is desirable that these leaves be picked up by the action of a lawn mower rotary blade in generating a forced draft of air through a chute on the lawn mower and transferred to a leaf mulcher which this invention provides.

2. Description of the Prior Art

U.S. Pat. No. 3,134,212 issued to Ira J. Gary on May 26, 1964 discloses a mulching attachment for connection with a lawn mower. This device features a mulching screen surrounding the periphery of the rotating mulching blade and having a mulching attachment in the lawn mower housing which ensures that the draft or inflow of air carries the vegetation to be comminuted from the ground into the mulch blade and the interior of the mulching attachment.

U.S. Pat. No. 3,657,865 issued to Howard C. Ober on Apr. 25, 1972 discloses a leaf mulcher for a riding lawn mower, in which grass clippings and leaves are shredded within the rotary blade housing and are discharged to a power driven rotary impeller laterally of the mower and is driven by the mower engine. The impeller drives the shredded material into and through an over hanging chute which directs the material into an open top receptacle mounted rearwardly of the mower.

U.S. Pat. No. 3,884,020 issued to Einar S. Dahl, et al, on May 20, 1975 discloses a leaf shredder for a rotary mower. The principal feature of this patent is a screen which is detachably mounted inside the blade housing extending transversely of the discharge outlet through which the material discharged from the interior of the blade housing must pass and is thereby shredded to a small particle size, suitable for mulching purposes.

U.S. Pat. No. 3,974,629 issued to Lionel E. Russell, et al, on Aug. 17, 1976 discloses a lawn mower in which the rotary blade thereof transfers grass cuttings and leaves picked up through a lateral mower housing chute into a housing, laterally of the mower housing which contains an auxiliary blade belt driven from the prime mover of the lawn mower for further cutting grass and leaves which are then discharged by the auxiliary rotating blade.

U.S. Pat. No. 4,189,904 issued to Alexander D. Paker on Feb. 26, 1980 discloses a leaf mulcher attachment for lawn mowers which comprises an plate having inwardly extending tines positioned in front of the grass ejection chute.

The vertical tines are struck out inwardly of the plate within the motor housing and shield the resulting holes in the plate. The tine-equipped plate thus effectively blocks the ejection chute and results in diverting the normal flow of leaves picked up by the mower blade so that the blade may have more than one pass at the leaves. The tines further operate to mulch the leaves as the leaves are forced by the tines by the mower blade lifting and ejection force.

A secondary mulching effect is achieved by the leaves being forced through the blade plate openings formed by the struck out tines.

U.S. Pat. No. 4,411,125 issued to Hubert E. Strickland on Oct. 25, 1983 discloses a multi-function apparatus for lawn maintenance.

The apparatus is provided with a wheel-equipped housing having an apertured upper deck on which an engine is centered. Conduits extend from the apertures to a collector box positioned above the engine. The rotary motion of the grass cutting blade generates an air and debris stream propelled upwardly through the housing apertures and conduits into the collector box. The debris is mulched by counter rotating blades with the exit of the collector box emptying into a bag mounted rearwardly of the mower.

U.S. Pat. No. 4,890,446 issued to Bert L. Israel on Jan. 2, 1990 discloses a mulching attachment for lawn mowers which features a mulching plate disposed within the cavity of a mower housing containing an angularly rotating blade with the plate disposed adjacent the path travel of the mower cutting blade so that the blade and plate forms a shearing or scissoring action on vegetation picked up by the rotary mower blade. The plate being disposed adjacent the discharge opening of the rotary mower housing to permit the air flow and discharge of finely mulched vegetation therethrough.

This invention is distinctive over the above and other similar patents by providing a housing surrounding a driven fan having cupped blades generating a forced air flow through intake and outlet chutes of the fan housing. Friction bars on the extremity of the respective fan blade cooperate with friction bars mounted on an arc of the perimeter of the fan housing for mulching leaves and other vegetation air blast forced therebetween before exiting the discharge chute.

SUMMARY OF THE INVENTION

A platform is connected at one end with a garden tractor type rotary mower housing and supported at its rearward end portion by one or more caster wheels.

A fan housing containing a rotating fan having a horizontal axle angularly rotated by a platform supported engine generates a forced air draft through intake and outlet conduits integrally connected with the fan housing. The cupped structure of the respective fan blade facing the direction of rotation substantially increases the air blast.

Friction bars on the extremity of each fan blade cooperate with stationary friction bars mounted on an arc of the periphery of the fan housing which pulverizes leaves or other vegetation passing between the friction bars.

The principal object of this invention is to provide a self contained vegetation mulching apparatus which may be connected with a garden-type tractor having a rotary blade lawn mower including a rear or side discharge for vegetation cut and picked up off the surface of the earth.

DESCRIPTION OF THE PREFERRED EMBODIMENTS

Figure 1:
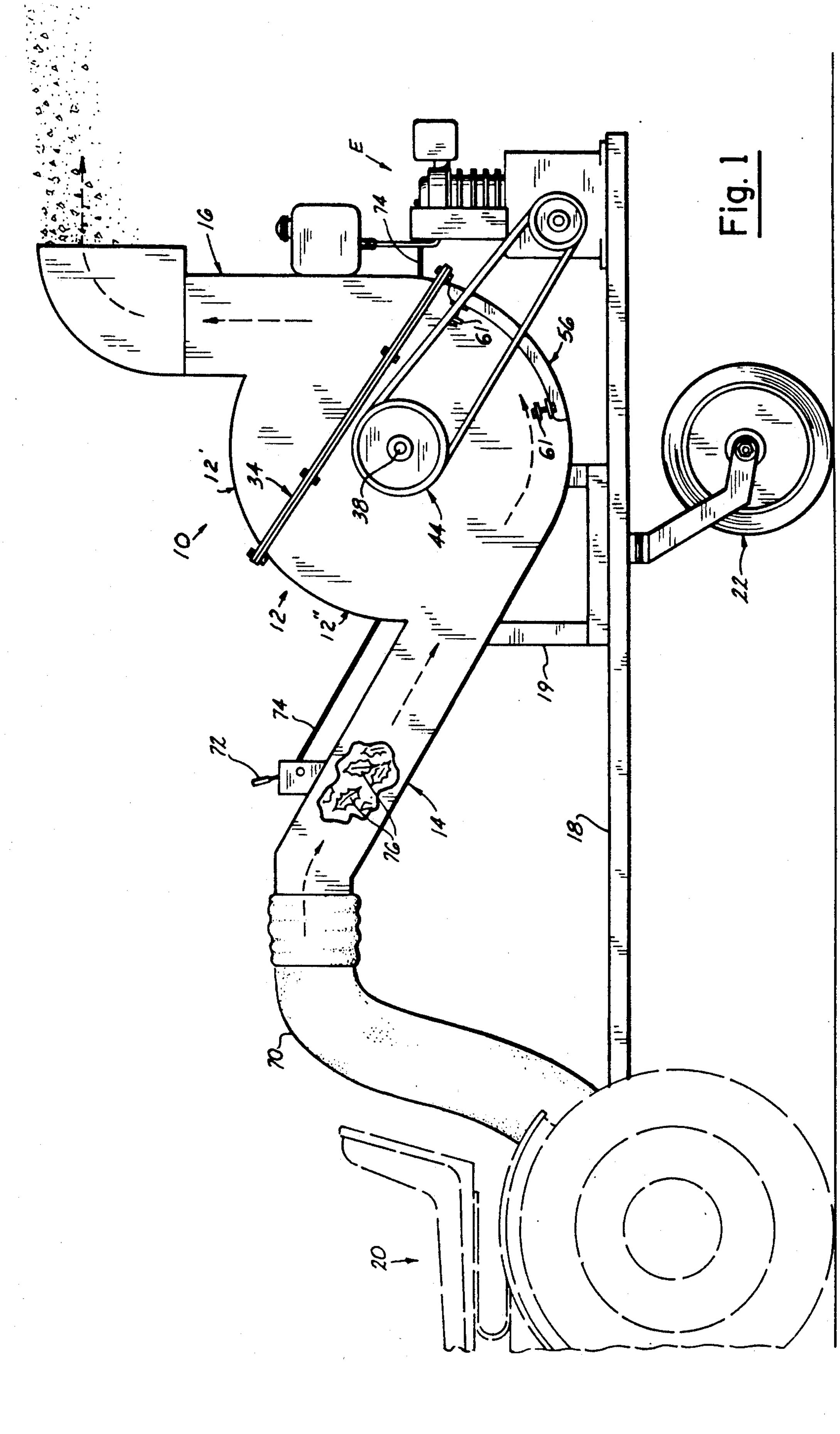
FIG. 1 is a side elevational view of the leaf mulcher with parts broken away for clarity and connected with a fragment of a garden tractor, the latter being shown by broken lines.
Figure 2:
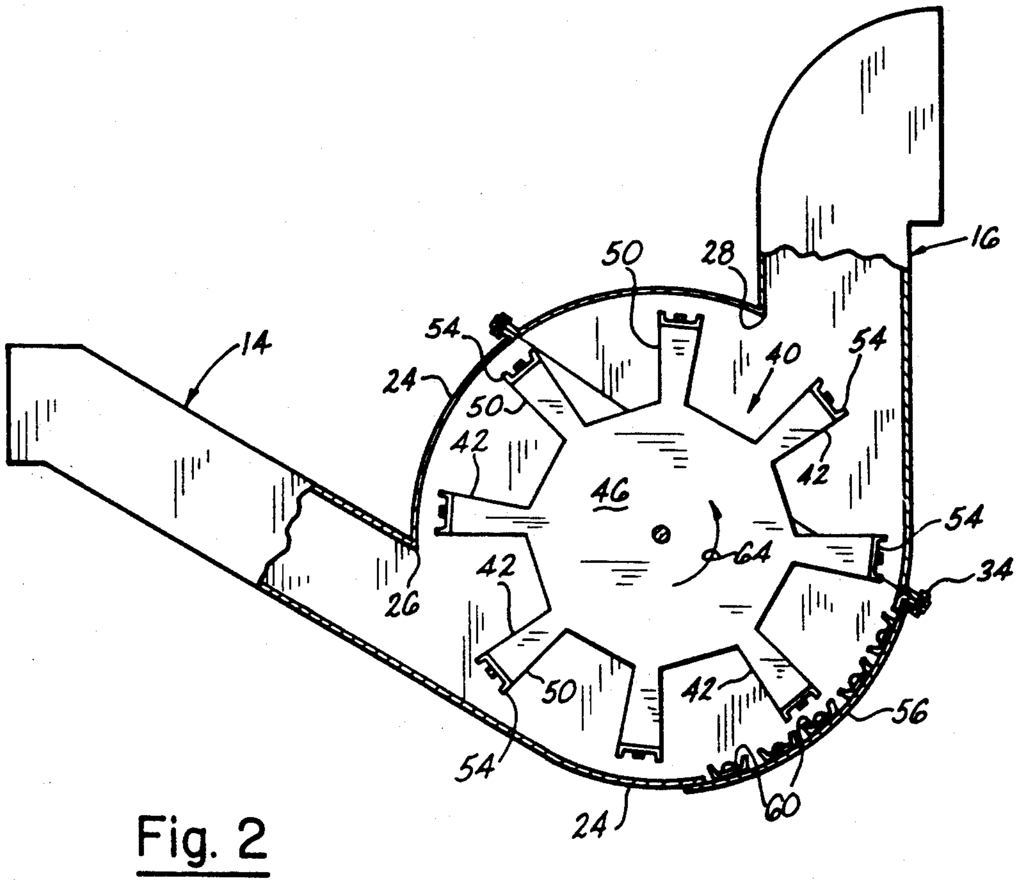
FIG. 2 is a vertical cross section view partially in elevation of the leaf mulcher housing, per se; and, FIG. 3 is a fragmentary perspective view of the leaf mulcher housing with its top section removed.

Like characters of reference designate like parts in those figures of the drawings in which they occur.

In the drawings:

The reference numeral 10 indicates the mulching apparatus as a whole comprising a substantially cylindrical fan housing 12 having an inlet conduit 14 and a discharge conduit 16 supported on a generally horizontal platform 18 by bracket members 19.

The forward end of the platform is connected with the housing, not shown, of a garden-type tractor, indicated at 20. The rearward end portion of the platform is supported by one or more caster wheels 22.

The fan housing 12 has a cylindrical wall 24 substantially diametrically interrupted by the inlet opening 26 and the discharge opening 28 respectively connected with the inlet conduit 14 and the discharge conduit 16. The housing further includes parallel end walls 30 and 32.

Figure 3:
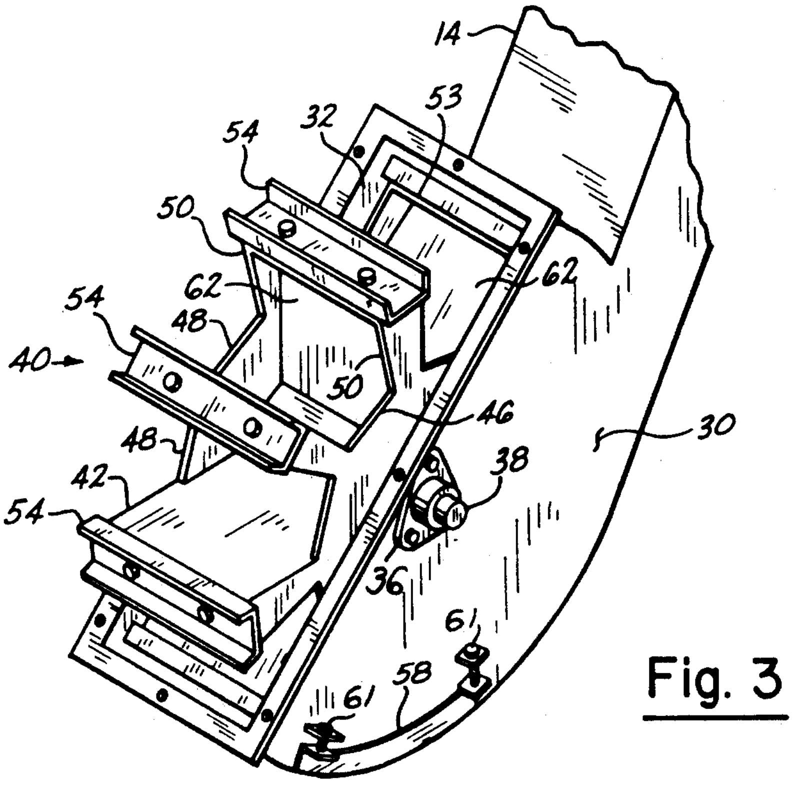

The housing 12 is transversely and longitudinally divided in diametrically offset relation to form a removable upper housing section 12' joined to the lower housing section 12" by flanges and bolts 34. The housing end walls 30 and 32 centrally support a pair of bearings 36, only one being shown, (FIG. 3) which journal a fan shaft 38.

A fan 40 having a plurality of equally spaced radially disposed blades 42 is mounted on and angularly rotated with the shaft 38 by belt and pulley means 44 driven by a motor or engine E supported by the platform 18.

The fan blades 42 extend between the fan housing end walls 30 and 32 and terminate in spaced relation with respect to the inner surface of the fan housing circumferential wall 24.

The fan 40 is characterized by polygonal end walls 46 and 48 which are disposed in the plane of the respective fan blade side edge with a portion of the respective polygonal wall 46 and 48 integral with and projecting radially coextensive with the respective fan blade 42 and forms a forwardly projecting edge portion 50 on each fan blade and defining a substantially rectangular fan blade end surface 53. A generally U-shaped section of channel 54 (FIG. 3) longitudinally extending between the housing end walls 30 and 32, forms one friction bar vegetation cutting blade and is longitudinally secured by its bight portion to each fan blade end surface 53.

A downward and rearwardly disposed arc of the fan housing circumferential wall 24 is removed for receiving a cover plate 56. The cover plate is coextensive with the aperture in the fan housing wall 24 and transversely equal in width to the spacing between the housing end walls 30 and 3 and is further characterized by upstanding relatively short side walls 58 which overlap the outer perimeter edge surface of the respective housing end wall 30 and 32.

The cover plate 56 inner surface is characterized by a plurality of transversely disposed U-shaped friction bars 60 secured thereto by their bight portions in equally spaced apart relation which cooperate with the friction bars 54 on the respective fan blade as they and angularly rotated and mulch leaves, grass or other vegetation air blast forced between the friction bars. The cover plate side walls 58 are adjustably connected with the respective housing end wall 30 and 32 by bolt and ear means 61 for positioning the friction bars 60 in predetermined spaced relation with respect to the fan friction bars 54.

The fan end walls 46 and 48 in combination with the fan blade stiffening wall sections 50 and 53 form a cup-like configuration 62 for each fan blade open in the direction of angular rotation of the fan, as indicated by the arrow 64.

The purpose of this cup-like configuration 62 for each fan blade is to enhance the movement of the forced air draft through the intake tube 14 and out the discharge tube 16.

OPERATION

In operation, the inlet conduit 14 is connected with the vegetation discharge opening of the tractor 20 by a flexible tube 70.

The engine E is started and adjusted for angular rotation of the fan 40 by a control lever 72 connected with the engine by a Bowden cable 74.

The tractor is moved across vegetation to be cut or leaves 76 to be picked up by the tractor rotary blade. The forced air draft generated by the tractor blade and fan 40 moves the leaves 76 through the intake conduit 14 where the friction blades 54 and 60 pulverize the leaves or the vegetation to minute or selected sizes and discharged through the discharge opening, as illustrated by FIG. 1.

Obviously the discharge opening may be connected to or provided with a receptacle, not shown, for collecting the mulched leaves and other vegetation if desired.

Obviously the invention is susceptible to changes or alterations without defeating its practicability. Therefore, I do not wish to be confined to the preferred embodiment shown in the drawings and described herein.

I claim:

1. In a mobile propelled rotary mower having a downwardly open tractor housing having an outlet port and having a power driven vegetation cutting and impelling blade rotatable in a horizontal plane within the tractor housing and operative to generate an air blast for propelling cut and other vegetation lying on the surface of the earth outwardly of the tractor housing through the outlet port, the improvement comprising:
   - platform means connected in trailer fashion with said tractor housing;
   - a fan housing having opposite end walls and a part-circular perimeter wall and having perimeter wall inlet and outlet openings;
   - inlet and outlet conduits connected, respectively, with the fan housing wall around the inlet and outlet openings;
   - other conduit means connecting the inlet conduit with the tractor housing outlet port for transferring vegetation from the tractor housing to said fan housing;
   - power driven fans means including a plurality of radially disposed cupped fan blades journalled by the end walls of said fan housing for increasing the velocity of the forced air blast through the fan housing; and, friction bar means including a plurality of channel members each having bight portions cooperatively secured, respectively by their bight portions, to the radially outward end of each fan blade and in the arcuate inner plane of an arc of the fan housing perimeter wall for shredding vegetation air blast forced between the friction bar means by the centrifugal force of the fan blades.

2. The combination according to claim 1 in which the end walls of said fan housing are vertically disposed and an arc of the perimeter wall is provided with a downward opening extending between the end walls;

a cover plate closing the fan housing downward opening and transversely supporting a plurality of said friction bars; and, means for positioning said cover plate toward and away from the arcuate plane of the perimeter wall.

* * * * *